United States Patent

Fujii et al.

[11] Patent Number: 6,164,124
[45] Date of Patent: Dec. 26, 2000

[54] SURFACE PROPERTY MEASURING DEVICE

[75] Inventors: Nobuyoshi Fujii, Kure; Tamenori Shirai, Miyazak-gun, both of Japan

[73] Assignee: Mitutoyo Corporation, Kawasaki, Japan

[21] Appl. No.: 09/210,933

[22] Filed: Dec. 15, 1998

[30] Foreign Application Priority Data

Dec. 26, 1997 [JP] Japan ................................ 9-358885

[51] Int. Cl.[7] ................................................ G01B 5/28
[52] U.S. Cl. ............................ 73/105; 33/554; 33/551
[58] Field of Search ........................ 73/105; 33/551, 33/553, 534, 558, 558.04, 559, 561

[56] References Cited

U.S. PATENT DOCUMENTS 5,193,289  3/1993  Fischer .
5,740,616  4/1998  Seddon et al. ............................ 33/554

FOREIGN PATENT DOCUMENTS 0 254 429   1/1988  European Pat. Off. .
26 54 421   6/1978  Germany .
58-76107    5/1983  Japan .
63-10481    1/1988  Japan .
63-10482    1/1988  Japan .
4-60523     9/1992  Japan .
5-75606    10/1993  Japan .

*Primary Examiner*—Daniel S. Larkin
*Attorney, Agent, or Firm*—Oliff & Berridge, PLC

[57] ABSTRACT

A surface property measuring device comprises a detector having a stylus for measuring surface property and a skid at a leading end thereof, and a driving mechanism for causing the detector to advance and retreat along a surface to be measured. The measuring device further comprises a detector-lifting plate having an engaging portion engaging with a protrusion of a connector housing when the detector retreats to the utmost. The detecting-lifting plate is fixed to a frame of the driving mechanism, for lifting the leading end of the detector to thereby separate the skid and the stylus from the surface to be measured when the detector retreats. This enables the surface to be measured, a nose, the stylus, and the skid which protrude from the detector, to be protected when arranging the measurement and also removing the measuring device after the measurement.

6 Claims, 15 Drawing Sheets

SURFACE PROPERTY MEASURING DEVICE

BACKGROUND OF THE INVENTION

1. Field of Invention

The present invention relates to a surface property measuring device comprising a detector having, at a leading end thereof, a stylus for measuring surface property, typically, surface roughness. The surface property measuring device further comprising a skid, and a driving mechanism for causing the detector to advance and retreat along a surface to be measured. In particular, the surface property measuring device is capable of protecting a nose, the stylus, and the skid which protrude from the detector.

2. Description of Related Art

A surface roughness measuring device has been widely used for applying a stylus on a surface to be measured and measuring the surface roughness by detecting a surface roughness-direction-wise displacement of the stylus while advancing and retreating a detector, including the stylus, along the surface to be measured. Thus, converting the detected displacement into an electrical signal and then processing the electrical signal in a predetermined manner.

Various detectors have been proposed for the surface roughness measuring device.

For example, in FIG. 22, Japanese Patent Publication (Kokoku) No. 4-60523 shows a surface roughness measuring device 30 comprising a sliding shaft 34 held on a bearing 33, which is disposed on a frame 32 of the driving mechanism, with the sliding shaft 34 sliding in an advancing and retreating direction (arrow A) of a detector 10 . The surface roughness measuring device 30 further comprises a drivingside connector 40 attached to the sliding shaft 34 through a moving block 36 and a leaf spring 38 with a feed block 44 fixed to the sliding shaft 34 through a connecting portion 42 for causing the sliding shaft 34 to advance and retreat in the direction shown by arrow A. A feed screw 46 is then engaged with the feed block 44 with a reduction gear 50 connected to the feed screw 46 through a coupling 48, and a motor 52 for rotation-driving the reduction gear 50.

In FIG. 22, reference numeral 14 designates a detector-side connector pin attached to a rear end (on the right-hand end of the drawing) of a case 12 of the detector 10 and engaged with the driving-side connector 40. The detector 10 further includes a stylus arm 18 having a stylus 16, with a nose 26 for protecting the stylus 16 and stylus arm 18, which moves up and down while following the surface to be measured at a leading end thereof (on the left-hand end of the drawing) and swinging in the case 12 with a fulcrum 20 as a center, the leaf spring shaped substantially like an L constituting the fulcrum 20 of the stylus arm 18. An inductance type displacement detector 22 disposed in the vicinity of a rear end of the stylus arm 18 for detecting an up-and-down movement of the rear end of the stylus arm 18, with a skid 24 for absorbing minute irregularities in the vicinity of the stylus 16 to thereby obtain a stable measured value,.

Further, Japanese Provisional Utility Model Publication (Kokai) No. 5-75606, describes an arm-retracting mechanism, FIG. 23, which includes a motor 60 which rotates with a disk 62 having a notch 62A, thereby causing the notch 62A to lift a bar 68 which causes the arm 66 with a stylus 64 at a leading end thereof, to retract.

In FIG. 23, reference numeral 70 designates a fulcrum of the arm 66, with a displacement detector 72 for detecting a displacement of a rear end of the arm 66 and a friction-transmitting wheel 74 for transmitting the rotation of the motor 60 in such a manner as to slip when a load exceeds a predetermined value.

Applicant proposes in Japanese Provisional Utility Model Publication (Kokai) No. 58-76107 a receiving means comprising an instantaneous exciting latch type mechanism; for receiving, in a protecting case, a stylus protruding from a stylus protruding opening portion against the urging force of a measuring pressure applying spring.

The applicant further proposes in Japanese Utility Model Publication (Kokoku) No. 63-10481 a stylus-protecting spring for urging a stylus arm by an urging force which overcomes an urging force of a measuring pressure applying spring in such a direction as that a stylus is received in a protecting case. Kokoku further proposes an electromagnet for absorbing the stylus-protecting spring due to the energization carried out in measurement, to thereby release the stylus arm from the urging force of the stylus-protecting spring.

Also, the applicant proposes in Japanese Utility Model Publication (Kokoku) No. 63-10482 a receiving means which jointly uses a permanent magnet and a pair of coils, when measuring, which causes permanent magnet piece-side end faces of the coils to be instantaneously excited to one of an N-pole and an S-pole, thereby causing the magnet piece to be separated from a stylus arm. When not measuring, the permanent magnet piece-side end faces of the coils is instantaneously excited to the other of the N-pole and the S-pole, thereby causing the magnet piece to press the stylus arm in an opposite direction to the urging direction of the measuring pressure applying spring.

However, any one of the devices requires an independent power source such as a motor, and an electromagnet, and thus has a complicated mechanism with the reliability of the operation is likely to come into question.

SUMMARY OF THE INVENTION

The present invention has been made in order to solve the above-mentioned conventional problems. It is therefore an object of the present invention to protect a surface to be measured, with a nose, a stylus, and a skid which protrudes from a detector when preparing the measurement, with a simple construction and without requiring an independent power source.

The invention provides a surface property measuring device comprising a detector having a stylus for measuring surface property and a skid at a leading end thereof, with a driving mechanism for causing the detector to advance and retreat along a surface to be measured. The device further comprises a detector-lifting means for lifting at least the leading end of the detector for separating the skid and the stylus from the surface to be measured when the detector retreats to the utmost.

According to the invention, the surface to be measured is not damaged by the stylus permanently contacting the surface to be measured. Further, when arranging the setting of an article to be measured and a measuring device, or when removing the measuring device after the measurement, etc., the nose, the stylus, and the skid of the detector are prevented from carelessly colliding with the article to be measured, thus preventing damage to the nose, the stylus, the skid, and the article to be measured. Furthermore, even when the measuring device is dropped by mistake, the nose, the skid, and the stylus of the detector can be protected.

The invention also provides a surface property measuring device wherein the detector-lifting means comprises a detector-lifting plate which engages with a part of a member which moves as the detector advances and retreats, to thereby lift the detector.

The invention also provides a surface property measuring device wherein the detector is detachable from the driving mechanism by connectors with an angle-like protrusion engaging with the detector-lifting plate disposed outside a driving-side housing of the connector.

The invention also provides a surface property measuring device wherein the position of the detector-lifting plate is adjustable in an advancing and retreating direction of the detector.

The invention also provides a surface property measuring device comprising an electric equipment section for housing the driving mechanism, wherein all of the detector is housed in the electrical equipment section when the detector retracts.

The invention further provides a surface property measuring device in which all of the detector is housed in the driving mechanism when the detector retracts.

These and other novel features and advantages of the present invention are described in or will become apparent from the following detailed description of preferred embodiments.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF PREFERRED EMBODIMENTS

Embodiments of the invention applied to a stationary portable surface roughness measuring device will be described hereinafter with reference to the drawings.

Figure 1:
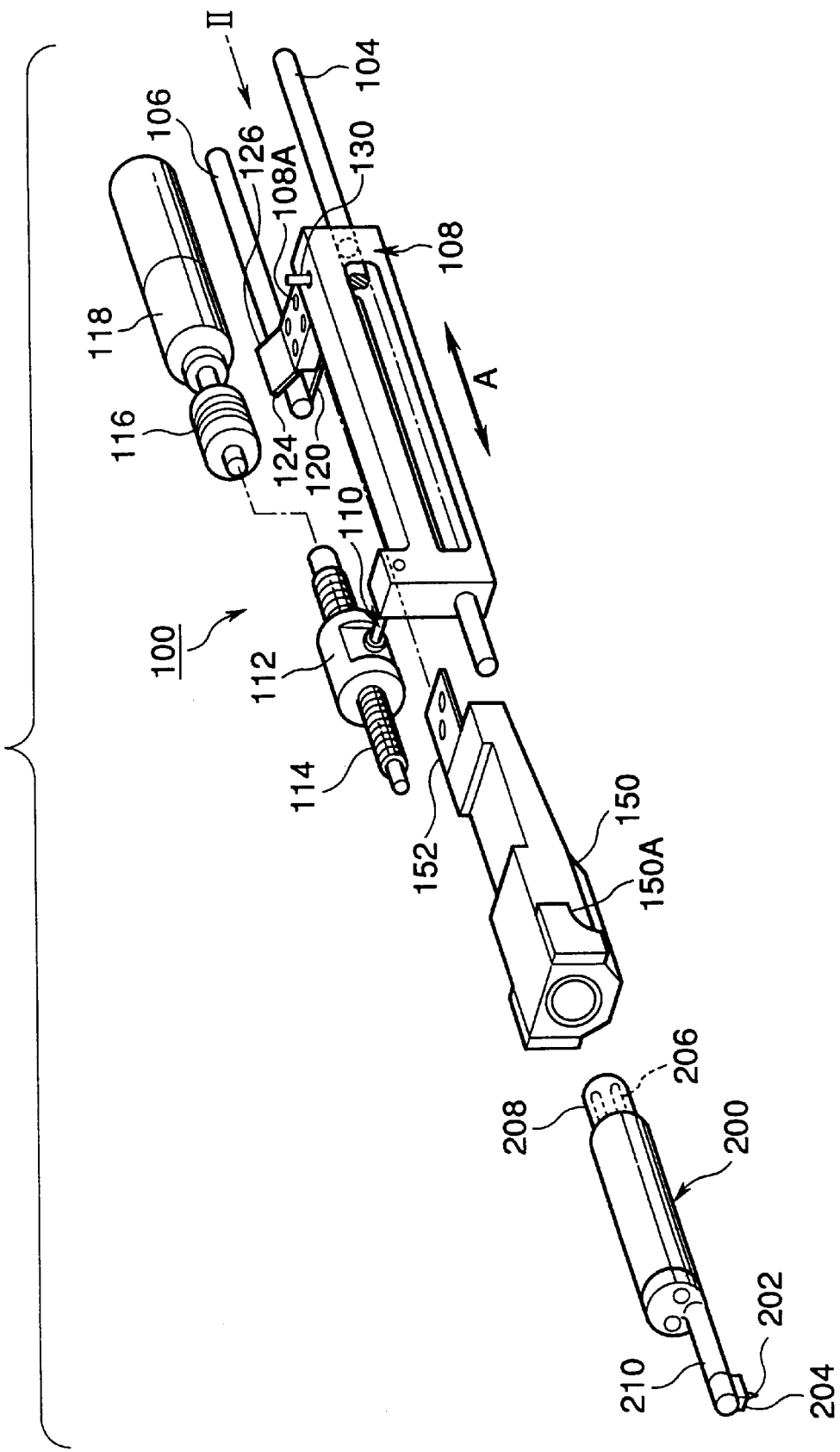
FIG. 1 is a perspective view showing the construction of a main part of a first embodiment of the present invention.
Figure 2:
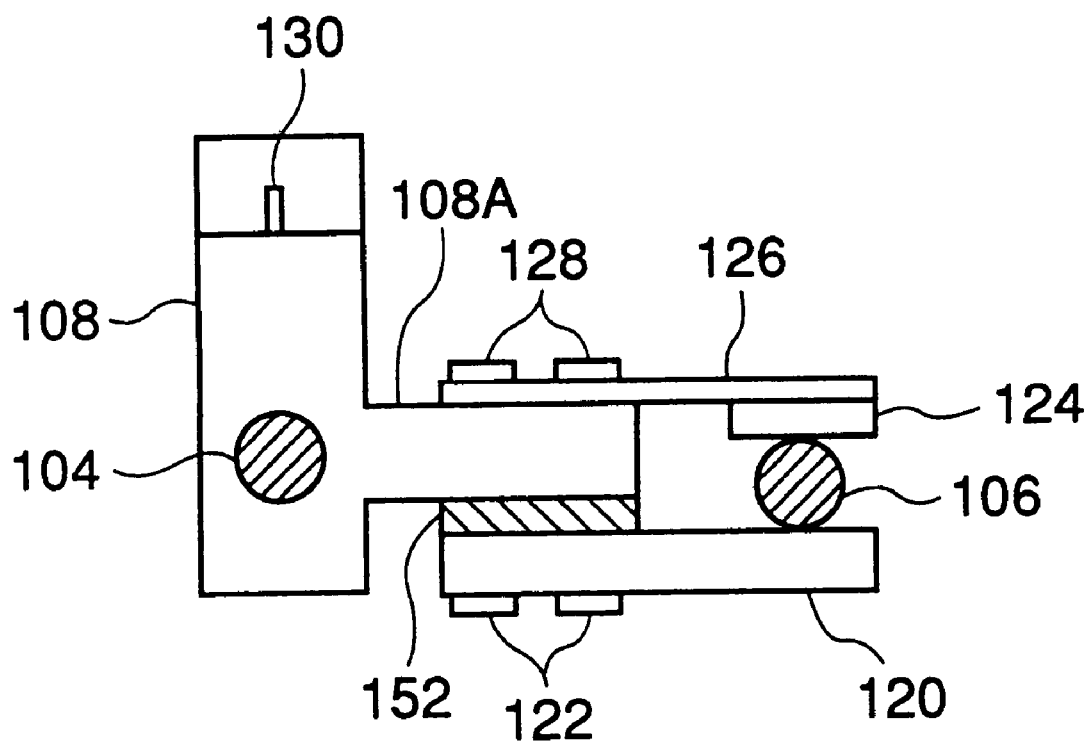
FIG. 2 is a side view viewed from the direction shown by the arrow II in FIG. 1.
Figure 3:
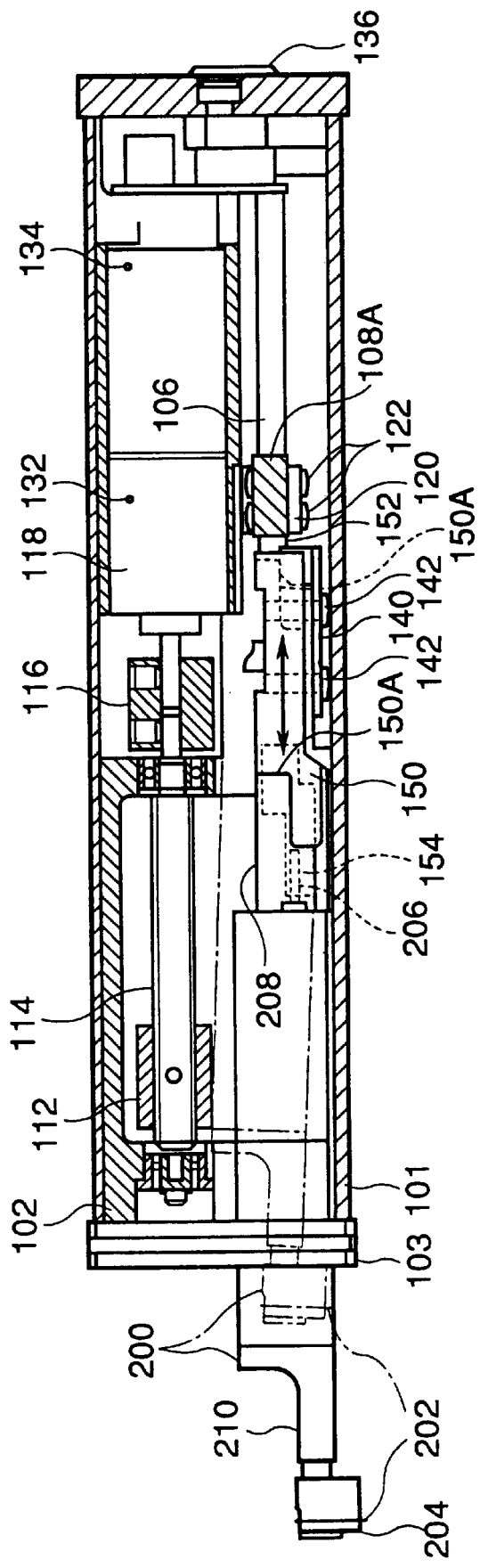
FIG. 3 is a longitudinal sectional view, viewed from its front, of a driving mechanism to which a detector according to the first embodiment is attached.
Figure 4:
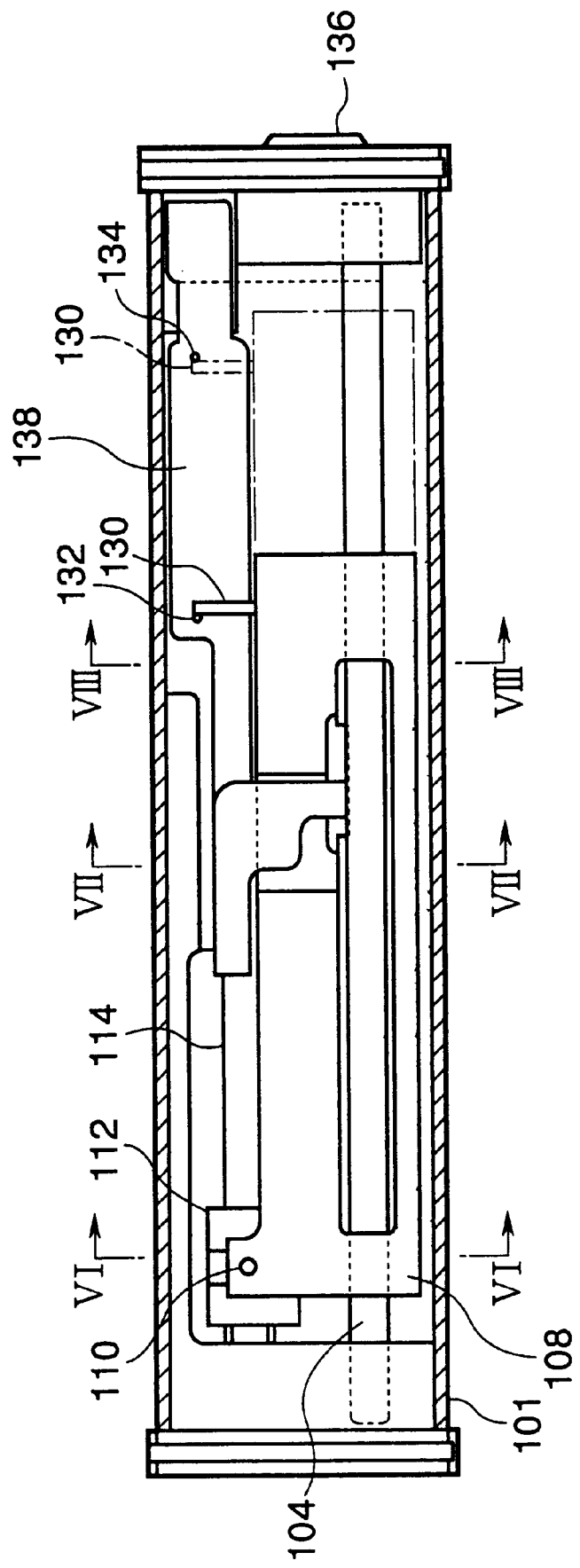
FIG. 4 is a longitudinal sectional view of the same viewed from above.
Figure 5:
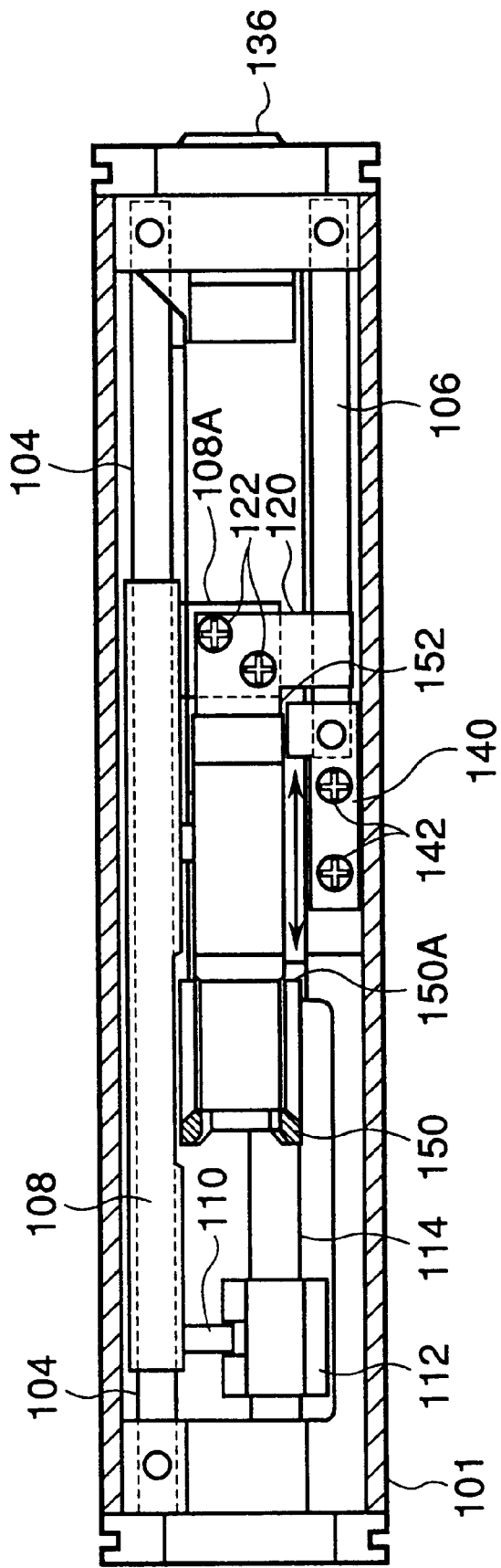
FIG. 5 is a longitudinal sectional view of the same viewed from the bottom.
Figure 6:
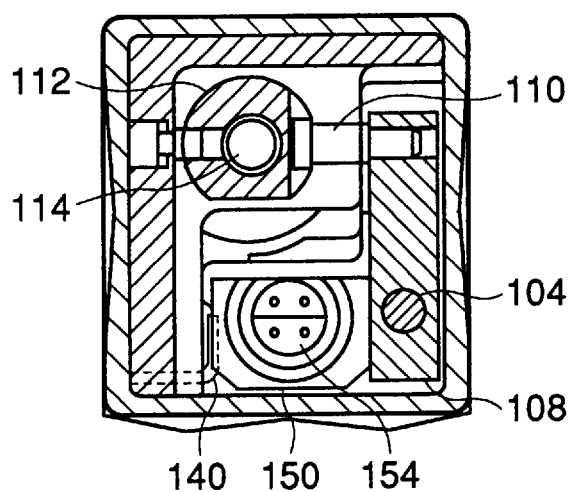
FIG. 6 is a lateral sectional view taken on the line VI—VI in FIG. 4.
Figure 7:
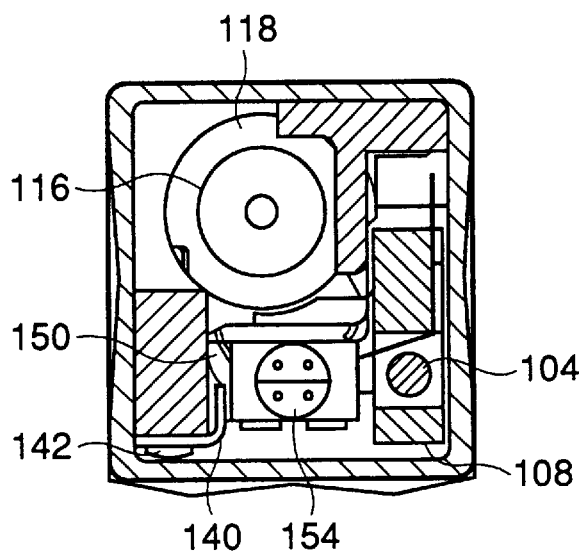
FIG. 7 is a lateral sectional view taken on the line VII—VII in FIG. 4.
Figure 8:
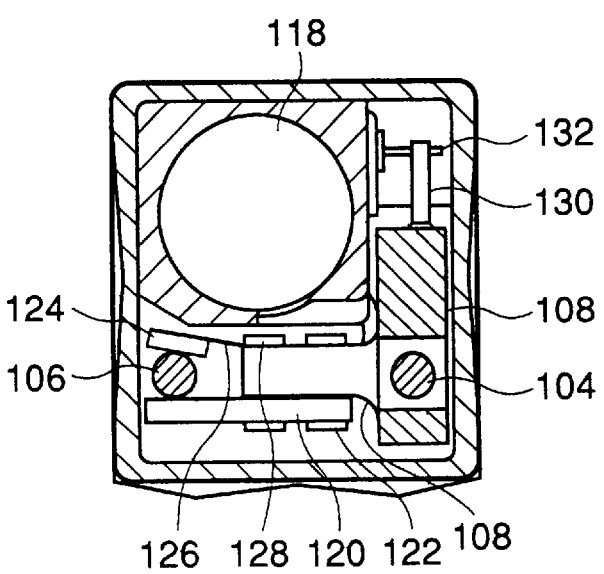
FIG. 8 is a lateral sectional view taken on the line VIII—VIII in FIG. 4.

FIG. 1 is a perspective view showing the construction of a main part of a first embodiment of the present invention; FIG. 2 is a side view viewed from the direction shown by the arrow II in FIG. 1; FIG. 3 is a longitudinal sectional view, viewed from its front, of a driving mechanism to which a detector according to a first embodiment is attached; FIG. 4 is a longitudinal sectional view of the same viewed from above; FIG. 5 is a longitudinal sectional view of the same viewed from the bottom; FIG. 6 is a lateral sectional view taken on the line VI—VI in FIG. 4; FIG. 7 is a lateral sectional view taken on the line VII—VII in FIG. 4; and FIG. 8 is a lateral sectional view taken on the line VIII—VIII in FIG. 4.

A driving mechanism 100 according to the present embodiment comprises a main shaft 104 and a sub shaft 106 which are fixed to a frame 102 of the driving mechanism 100. The driving mechanism 100 further includes a slide block 108, which is shaped substantially like an O, elongated in an advancing and retreating direction (in the direction shown by the arrow A) of a detector while sliding on the shafts 104, 106, with the main shaft 104 inserted through at a forward and a rear location. An interlinking rod 110 and a feed nut 112 causes the slide block 108 to advance and retreat along the shafts 104, 106 with a feed screw 114 screwed with the feed nut 112 and a gear motor 118 for rotating the feed screw 114 through a flexible coupling 116.

As shown in FIG. 2, a detector mount 108A is formed on a rear end of the slide block 108. On the lower side of the slide block 108 are bolts 122 for affixing both a leaf spring 152, which is attached to a rear end of a connector housing 150 for containing a detector 200 and for providing a skid pressure, and a shaft supporting plate 120 for pressing a lower surface of the sub shaft 106. Further, a leaf spring 126 comprises bolts 128 on the upper side of the detection mount 108A on which a sliding plate 124, for pressing an upper side of the sub shaft 106, is fixed.

Figure 9:
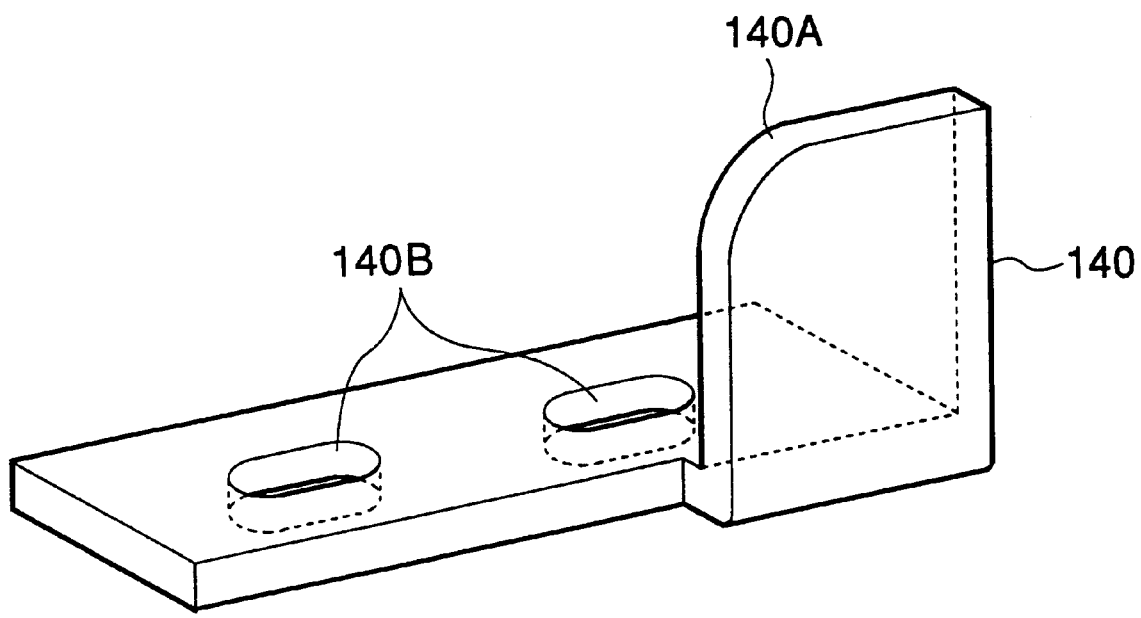
FIG. 9 is a perspective view of a detector-lifting plate used in the first embodiment, which is useful in explaining the shape of the detector-lifting plate.

As shown in FIG. 5, an L-like detector-lifting plate 140, shown in FIG. 9, is fixed to the frame 102 by bolts 142. The detector-lifting plate 140 is adapted so that an engaging portion 140A thereof engages with an angle-like protrusion 150A formed on an outer side face of the connector housing 150 at a retracting location of the detector 200 in the vicinity of its retreating limit position. Therefore, at the retracting location of the detector 200, the protrusion 150A of the connector housing 150 runs on to the engaging portion 140A of the detector-lifting plate 140, thereby causing the connector housing 150 to be lifted with a leaf spring 152 as a center. This causes the stylus 202 and the skid 204 disposed at a leading end of the detector 200 to be separated from the surface to be measured, and hence prevent them from protruding downward from a bottom surface of the driving mechanism 100.

A bolthole 140B for fixing the detector-lifting plate 140 is, in FIG. 9, elongated in an advancing and retreating direction of the detector 200. Adjusting the fixing position of the detector-lifting plate 140 enables a location such that a head of the detector 200 starts ascending for adjustment. This prevents the head of the detector 200 from colliding with the driving mechanism, the electrical equipment section, and a ceiling portion of an inlet for the detector when the detector retracts for the head to thereby ascend.

In FIGS. 1 to 3; reference numeral 101 designates a case of a driving mechanism 130; a switch pin uprightly planted on the slide block 108; 132 and 134 a fore and a rear end switch engaging with the switch pin 130 to stop or reverse the gear motor 118; 154 a driving-side connector contained in the connector housing 150; 206 a detector-side connector pin inserted into the driving-side connector 154; 208 a connector housing of the detector, and 210 a nose of the same.

Figure 10:
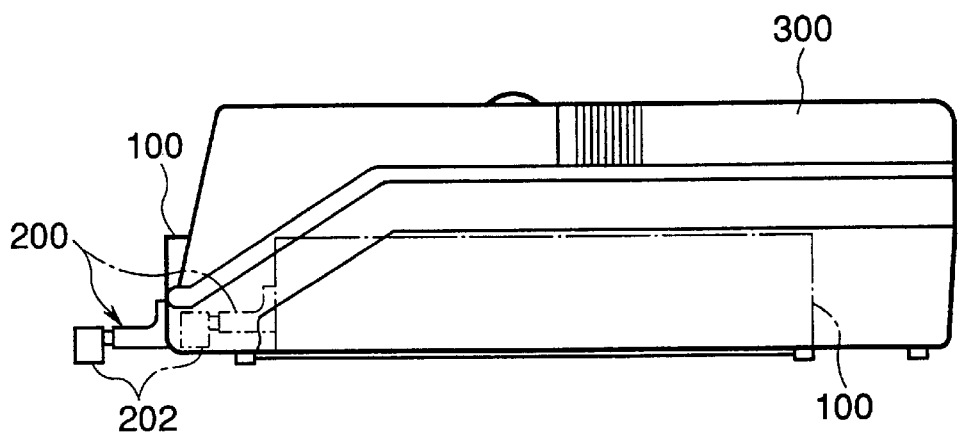
FIG. 10 is a front view showing a state in which the driving mechanism of the first embodiment is contained in an electrical equipment section.
Figure 11:
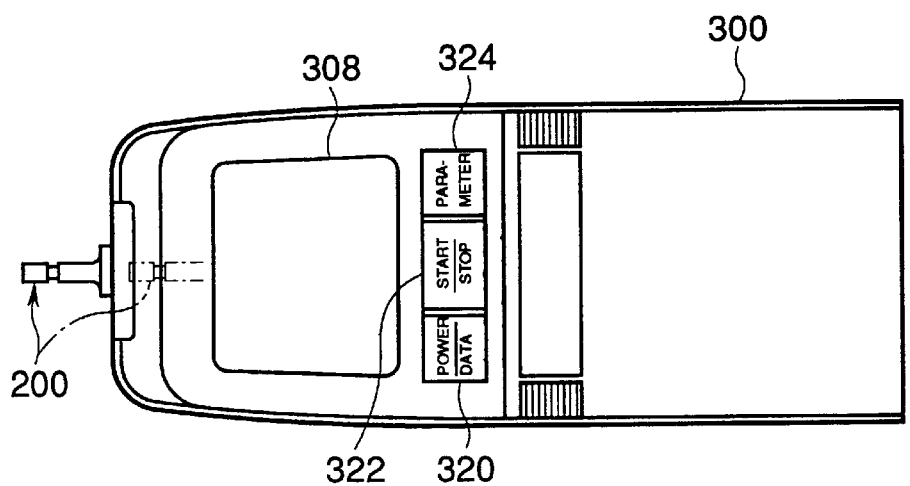
FIG. 11 is a plan view of the same.
Figure 12:
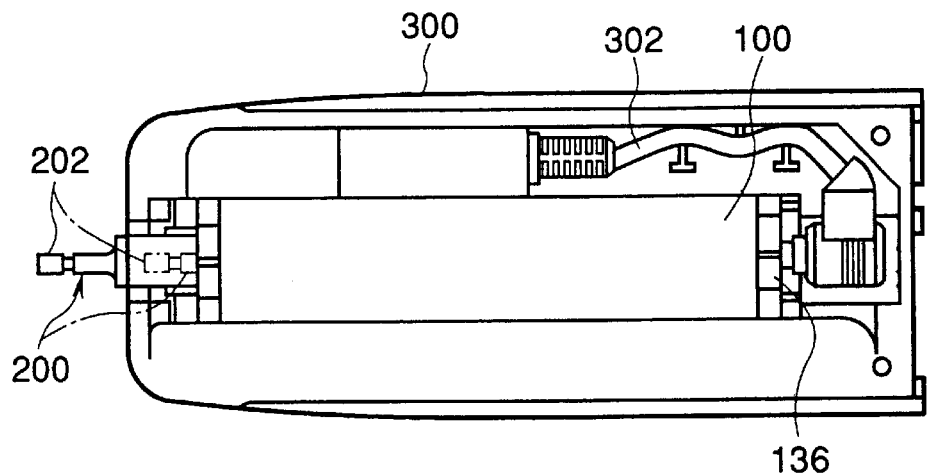
FIG. 12 is a bottom view of the same.

The driving mechanism 100 can be contained in an electrical equipment section 300, as shown in FIGS. 10 to 12 described later. On a rear end of the driving mechanism 100 is disposed an electrical equipment-side connector 136 electrically connected to the electrical equipment section 300, with a portion between the electrical equipment-side connector 136 and the driving-side connector 154 wired by a thin flexible printed circuit substrate (FPC)138, through the connector housing 150.

Figure 13:
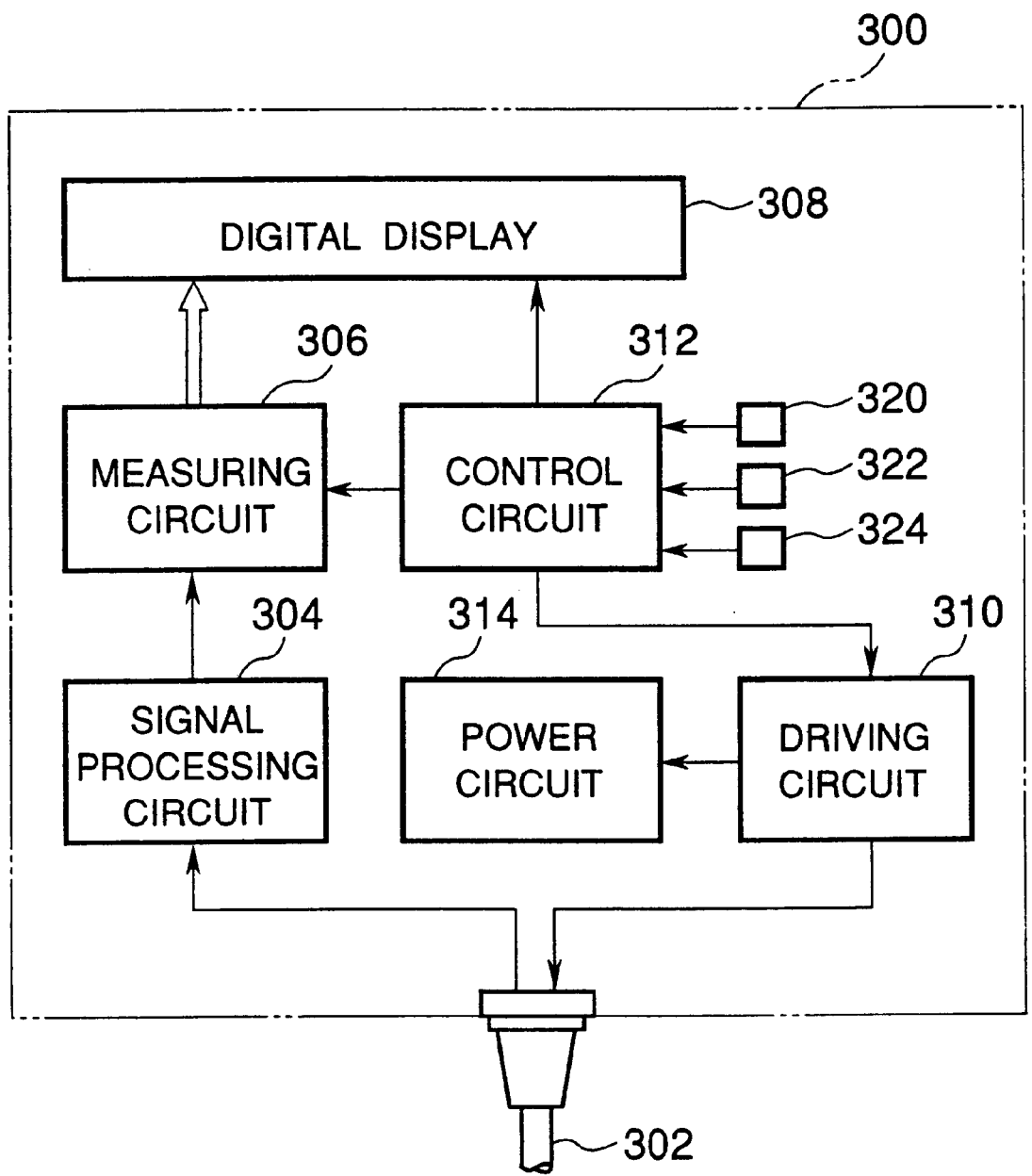
FIG. 13 is a block diagram showing the construction of the electrical equipment section.

The electrical equipment section 300 mainly comprises, as shown in FIG. 10 (front view), FIG. 11 (plan view), FIG. 12 (bottom view), and FIG. 13 (block diagram), a signal processing circuit 304 for processing a signal, which is obtained from the detector 200 contained in the driving mechanism 100 through a cable 302 connected with the electric equipment-side connector 136. The electrical equipment section further comprises a measuring circuit 306 for obtaining a surface roughness corresponding to various kinds of parameters based on the signal from the signal processing circuit 304, a digital display 308 for displaying the measured value obtained by the measuring circuit 306, a driving circuit 310 for driving the gear motor 118 in the driving mechanism 100 through the cable 302, a control circuit 312 for controlling the driving circuit 310, the measuring circuit 306, and the digital display 308, and an electric power circuit 314 for supplying an electric power to the above respective circuit.

The solid line in the drawing shows the position of a leading end of the detector 200 exposed when measuring, and the one dot chain line shows the position of the leading end of the detector 200 exposed when it is housed in the electrical equipment section 300.

In FIGS. 11 and 13, reference numeral 320 designates an electric power switch, 322 a start switch, and 324 a parameter-selecting switch.

Figure 14:
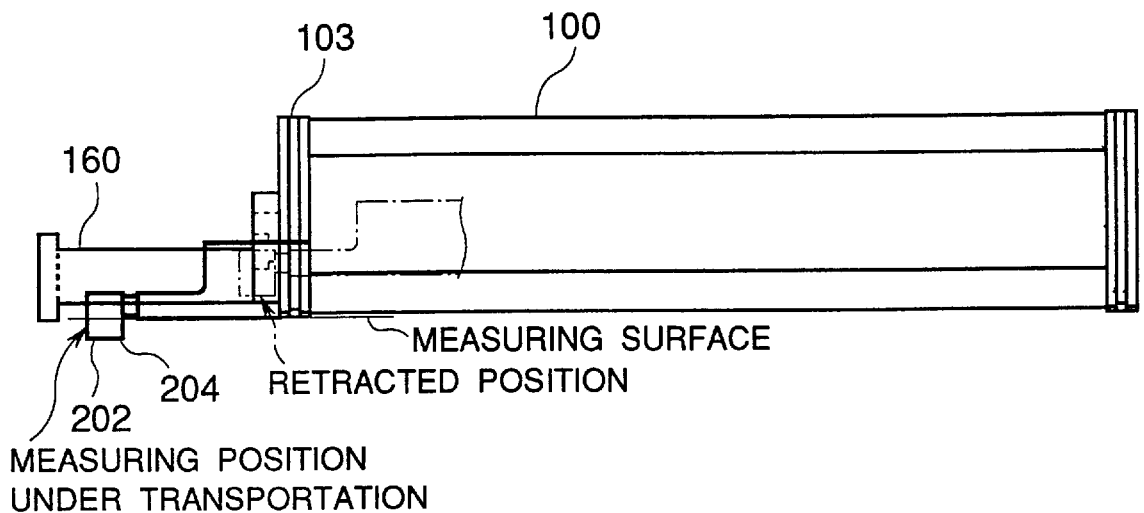
FIG. 14 is a front view showing a nosepiece-attached state in the first embodiment.
Figure 15:
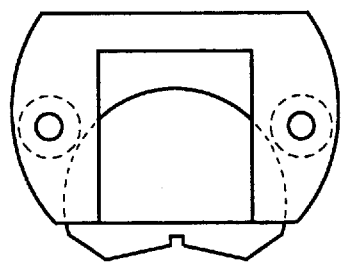
FIG. 15 is a left-hand side view of a nosepiece for cylinder measurement, which is useful in explaining the front shape of the nosepiece.
Figure 16:
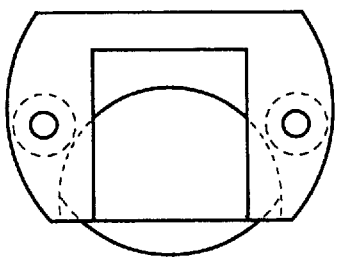
FIG. 16 is a left-hand side view of a nosepiece for plane measurement, which is useful in explaining the front shape of the nosepiece.
Figure 17:
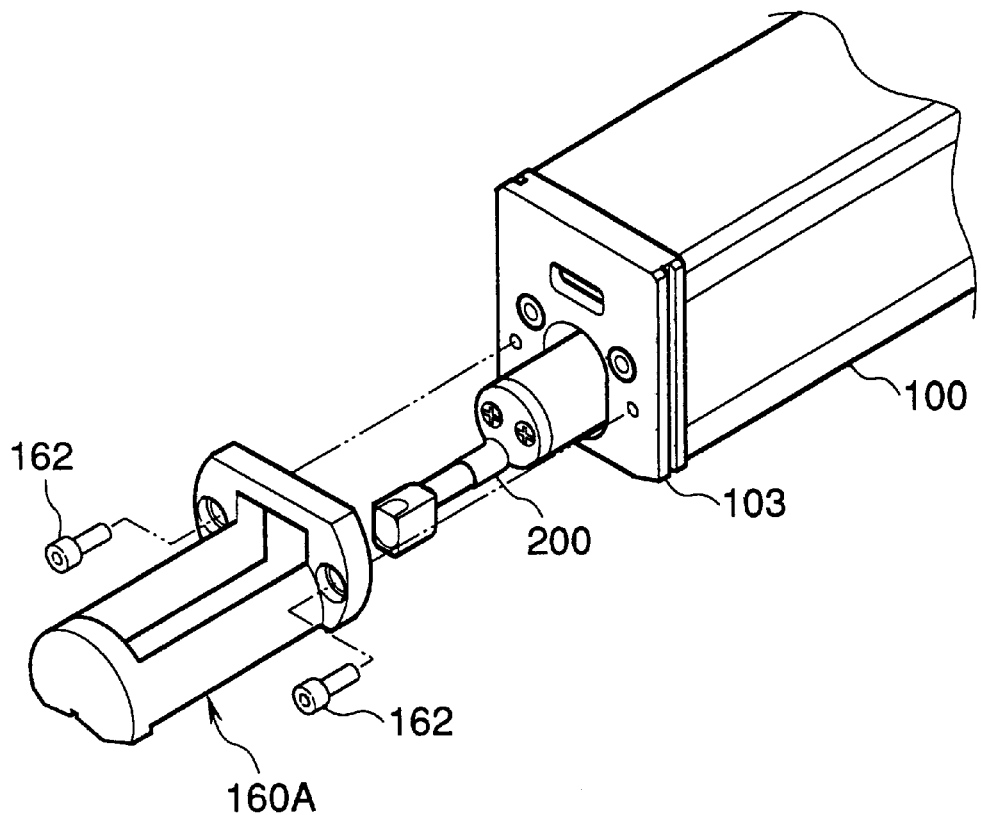
FIG. 17 is an exploded perspective view of the nosepiece for cylinder measurement.
Figure 18:
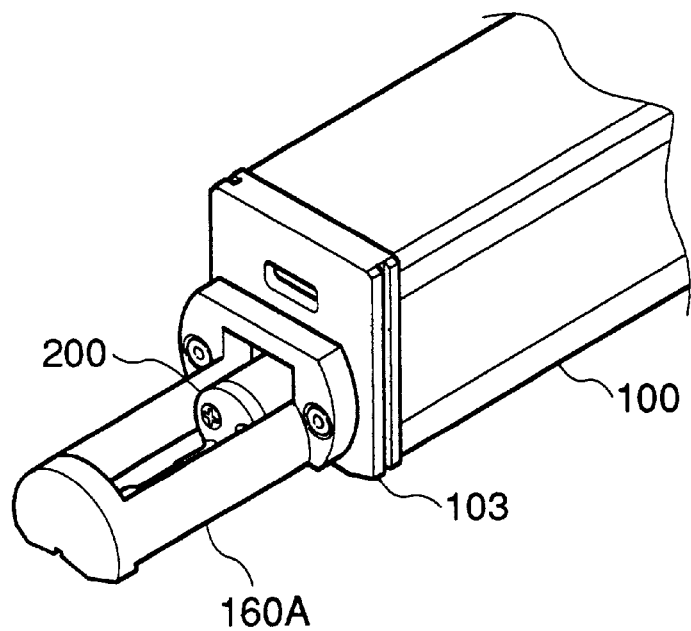
FIG. 18 is a perspective view showing the nosepiece for cylinder measurement in attached state.
Figure 19:
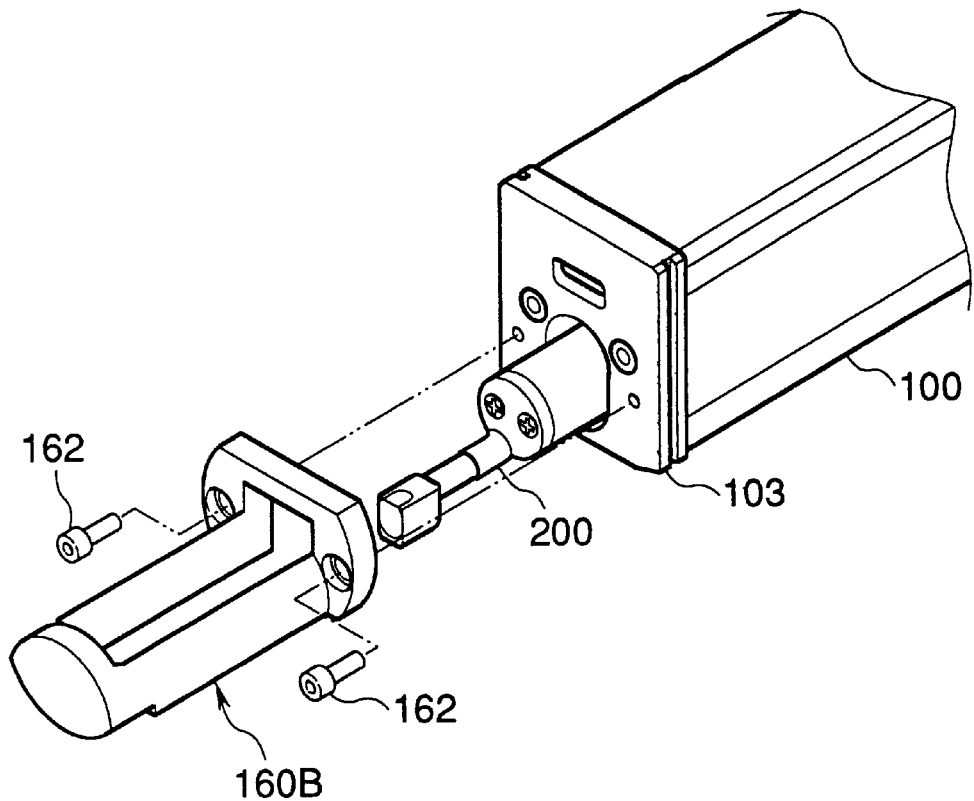
FIG. 19 is an exploded perspective view of the nosepiece for plane measurement.
Figure 20:
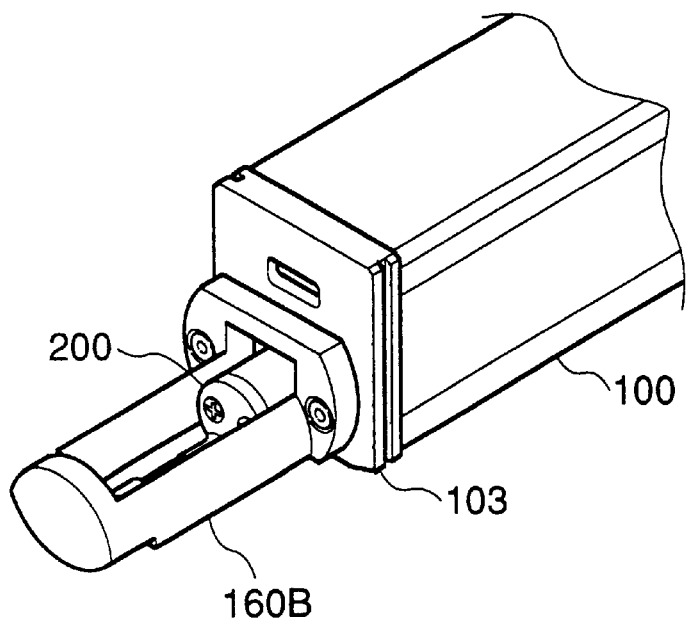
FIG. 20 is a perspective view showing the nosepiece for plane measurement in attached state.

As shown in FIG. 14, a nosepiece 160 for protecting the leading end of the detector 200, etc., is disposed on a front end of the driving mechanism 100. The nosepiece 160 includes a nosepiece 160A for cylinder measurement, which is concave in its front bottom shape as shown in FIGS. 15, 17, and 18, and a nosepiece 160B for plane measurement, which is convex in its front bottom shape as shown in FIGS. 16, 19 and 20. The nosepiece 160A for cylinder measurement is attached to the driving mechanism 100 by bolts 162 as shown in FIG. 17 (an exploded perspective view) and FIG. 18 (a perspective view in the nosepiece-attached state), and the nosepiece 160B for plane measurement as shown in FIG. 19 (an exploded perspective view) and FIG. 20 (a perspective view in the nosepiece-attached state).

Using such a nosepiece 160 makes it difficult for the leading end of the detector 200, etc., to be affected by an external force except for the surface to be measured, when measuring, thereby resulting in sufficient protection of the detector 200. However, the leading end (the skid 204 and the stylus 202) of the detector 200, as shown in FIG. 14, protrudes from the surface to be measured, when transporting, thereby possibly providing damages without protection. To prevent this, according to the invention, separating the leading end of the detector 200 from the surface to be measured, and hence retracting it, prevents the leading end of the detector 200 from protruding from the surface to be measured, thereby causing the leading end of the detector 200 to be received in the nosepiece 160, which realizes sure protection even when transporting the detector, etc.

When measuring, according to the object to be measured, it is, as shown in FIGS. 10 to 12, determined whether the driving mechanism 100 is used in such a manner that it is housed in the electrical equipment section 300, or if the driving mechanism 100 is independently used in such a manner that it is separated from the electrical equipment section 300. For example, when measuring an inner surface of a small hole, the measurement is made with the driving mechanism 100 removed because the electric equipment section 300 is obstructed. The driving mechanism 100 united to the electric equipment section 300 in the other cases.

In concrete terms, the stylus 202 of the detector 200 is contacted to a surface to be measured, the electric power switch 320 is turned on, and the start switch 322 is pressed. Then, the control circuit 312 causes the gear motor 118 to rotate through the driving circuit 310. When rotation of the gear motor 118 causes the feed screw 114 to rotate, the slide block 108 is moved in an axial direction of the feed screw 114; therefore, the stylus 202 of the detector 200 is displaced up and down according to the surface roughness of an article to be measured.

The displacement of the stylus 202 is converted into an electrical signal by the detector 200, then transmitted to the signal processing circuit 304 through a cable 302. Thereafter, the processed signal is transmitted to the measuring circuit 306. The measuring circuit 306 obtains the surface roughness based on the signal transmitted from the signal processing circuit 304 according to the parameters instructed from the control circuit 312, and allows it to be displayed on the digital display 308.

On the other hand, during the retraction before the measurement, or after the measurement the connector housing 150 and the detector 200 connected thereto are retreated deep to the utmost in the driving mechanism 100 by an instruction of retraction. Then, the protrusion 150A disposed outside the connector housing 150 runs on to the engaging portion 140A of the detector-lifting plate 140, thereby causing the leading end of the detector 200 to be lifted with the leaf spring 152 as a center, which causes the stylus 202 and the skid 204 to be separated from the surface to be measured. This prevents the stylus from permanently contacting to the surface to be measured, thereby preventing the surface of an article to be measured from being damaged. Furthermore, when arranging the roughness-measurement of the roughness measuring device and removing the roughness measuring device after the measurement, the nose 210, the stylus 202 and the skid 204 are prevented from carelessly colliding with the article to be measured, which prevents these components, and the article to be measured, from being damaged.

According to this embodiment, the detector 200 is retreated deep to the utmost in the driving mechanism 100, and then all of the detector is received in the electrical equipment section 300 when it is at a retracted position, which enables the nose, the skid, and the stylus of the detector to be protected even if the measuring device is carelessly collided with a certain object, or is dropped.

This embodiment has a receiving construction such that all of the detector is received not in the driving mechanism, but in the electric equipment section 300, which prevents the driving mechanism from becoming large-sized.

Next, a surface roughness measuring device according to a second embodiment of the invention in which all the detector is received in the driving mechanism will be described hereinbelow.

Figure 21:
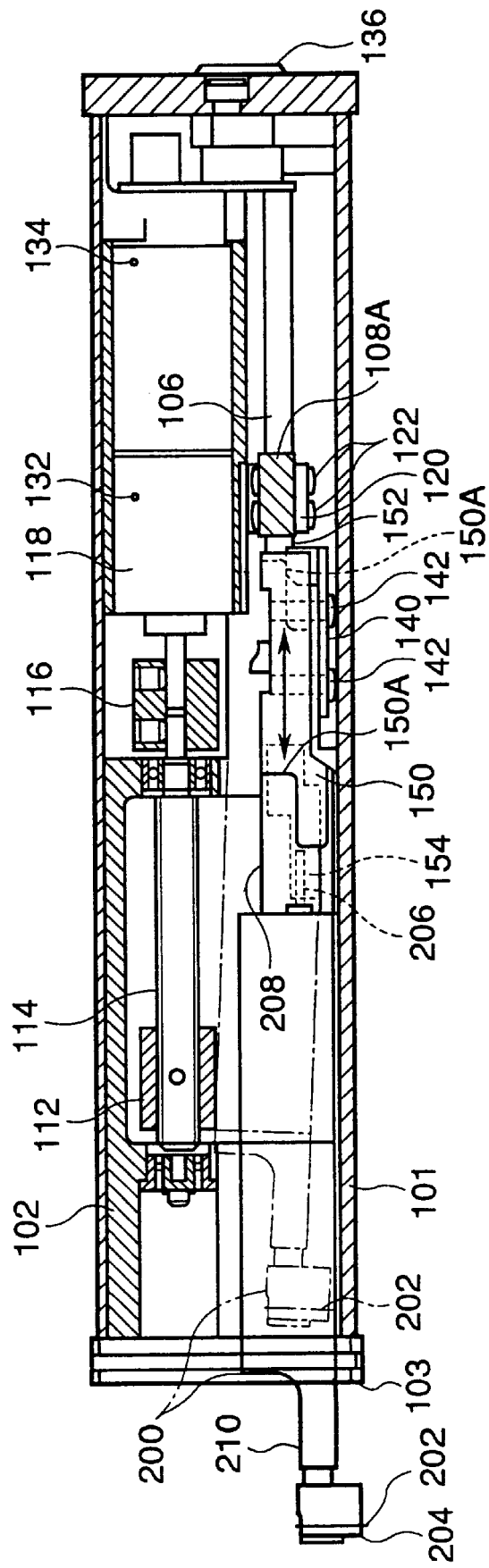
FIG. 21 is a longitudinal sectional view, viewed from the front side, of a driving mechanism in a second embodiment of the invention.
Figure 22:
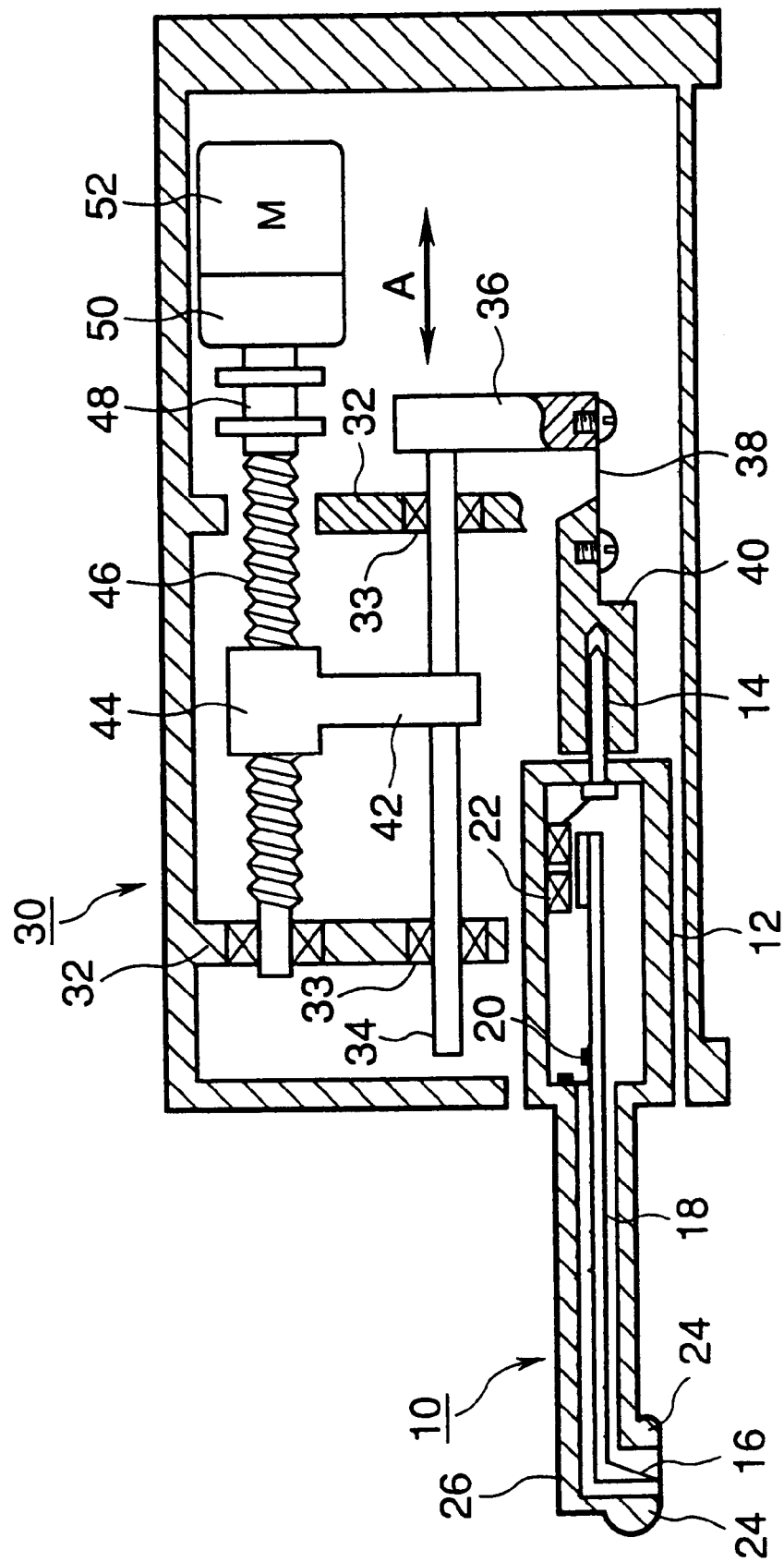
FIG. 22 is a sectional view of an arrangement of a stationary type surface roughness measuring device proposed in Japanese Utility Model Publication (Kokoku) No. 4-60523.
Figure 23:
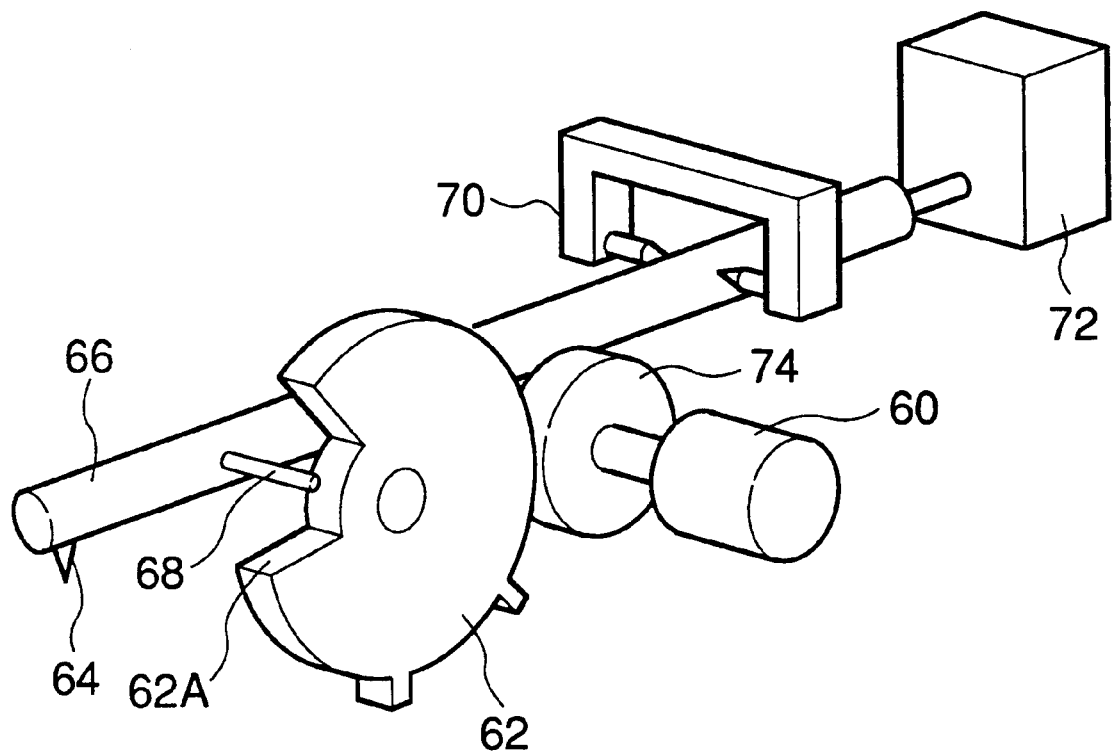
FIG. 23 is a perspective view of an arm-retracting mechanism proposed in Japanese Utility Model Publication (Kokoku) No. 5-75606.

In a surface roughness measuring device according to the second embodiment, the case 101 of the driving mechanism 100 extends forward, so that the stylus 202 and the skid 204 of the leading end of the detector 200 are completely received in the driving mechanism 100 when they are at a retracted position as shown in FIG. 21.

According to this embodiment, the nose 210, the stylus 202, and the skid 204 of the detector 200 can be protected even if the driving mechanism 100 is independently transported and carelessly collided with a certain object, or is dropped.

According to any one of the above-mentioned embodiments, lifting the detector 200 with the leaf spring 152 as a center, by a combination of the detector-lifting plate 140 and the angle-like protrusion 150A formed outside the connector housing 150, makes the construction simple.

Moreover, the construction of lifting the detector when retracting the detector is not limited to the above.

In any one of the embodiments, the invention is applied to the stationary portable surface roughness-measuring device, the application of the invention is not limited thereto, and hence the invention can be applied to, for example, contour measuring devices, and surface roughness for three-dimensional coordinates measuring machines.

Although certain preferred embodiments have been shown and described, it should be understood that many changes and modifications may be made therein without departing from the scope of the appended claims.

What is claimed is:

1. A surface property measuring device comprising a detector having a stylus for measuring a surface property and a skid at a leading end thereof, and a driving mechanism for causing said detector to advance and retreat along a surface to be measured, wherein
said device comprises a detector-lifting means for lifting at least said leading end of said detector to separate said skid and said stylus from said surface to be measured, when said detector retreats to an utmost.

2. A surface property measuring device as claimed in claim 1, wherein the said detector-lifting means comprises a detector-lifting plate which engages with a part of a member moving as said detector advances and retreats, to thereby lift said detector.

3. A surface property measuring device as claimed in claim 2, wherein said detector is detachable from said driving mechanism by connectors, and an angle-like protrusion engaging with said detector-lifting plate is disposed outside a driving-side housing of said connector.

4. A surface property measuring device as claimed in claim 2, wherein the position of said detector-lifting plate is adjustable in an advancing and retreating direction of said detector.

5. A surface property measuring device as claimed in claim 1, further comprising an electric equipment section for housing said driving mechanism, wherein all of said detector is housed in said electrical equipment section when said detector retracts.

6. A surface property measuring device as claimed in claim 1, wherein all of said detector is housed in said driving mechanism when said detector retracts.

* * * * *